(12) United States Patent
Ohta

(10) Patent No.: US 9,487,667 B2
(45) Date of Patent: Nov. 8, 2016

(54) INK JET PRINTING METHOD

(75) Inventor: Hitoshi Ohta, Shiojiri (JP)

(73) Assignee: Seiko Epson Corporation (JP)

( * ) Notice: Subject to any disclaimer, the term of this patent is extended or adjusted under 35 U.S.C. 154(b) by 808 days.

(21) Appl. No.: 12/575,737

(22) Filed: Oct. 8, 2009

(65) Prior Publication Data

US 2010/0086692 A1    Apr. 8, 2010

(30) Foreign Application Priority Data

Oct. 8, 2008  (JP) ................. 2008-261294

(51) Int. Cl.
   *B05D 5/06*    (2006.01)
   *C09D 11/40*   (2014.01)
   *C09D 11/322*  (2014.01)

(52) U.S. Cl.
   CPC ............. *C09D 11/40* (2013.01); *C09D 11/322* (2013.01)

(58) Field of Classification Search
   CPC ............................. C09D 11/40; C09D 11/322
   USPC ..................................................... 427/207.1
   See application file for complete search history.

(56) References Cited

U.S. PATENT DOCUMENTS

| | | | |
|---|---|---|---|
| 5,609,671 A | 3/1997 | Nagasawa | |
| 5,928,419 A | 7/1999 | Uemura et al. | |
| 5,976,233 A | 11/1999 | Osumi | |
| 6,087,416 A | 7/2000 | Pearlstine et al. | |
| 6,123,759 A | 9/2000 | Mise et al. | |
| 6,136,286 A | 10/2000 | Okuyama et al. | |
| 2003/0171481 A1* | 9/2003 | Toyoda | 524/502 |
| 2004/0113962 A1* | 6/2004 | Mori | 347/12 |
| 2004/0196343 A1* | 10/2004 | Maekawa et al. | 347/100 |
| 2005/0128268 A1* | 6/2005 | Takashima | 347/100 |
| 2005/0176847 A1 | 8/2005 | Cagle | |
| 2006/0147828 A1* | 7/2006 | Yuasa | 430/108.4 |
| 2007/0106962 A1* | 5/2007 | Sakakibara et al. | 716/1 |
| 2007/0197685 A1* | 8/2007 | Aruga et al. | 523/160 |
| 2008/0022887 A1* | 1/2008 | Tanoue et al. | 106/31.2 |
| 2009/0035682 A1* | 2/2009 | Shima et al. | 430/108.4 |

FOREIGN PATENT DOCUMENTS

| | | |
|---|---|---|
| JP | 56-028256 | 3/1981 |
| JP | 62-001426 | 1/1987 |
| JP | 03-056573 | 3/1991 |
| JP | 03-079678 | 4/1991 |
| JP | 03-160068 | 7/1991 |
| JP | 04-018462 | 1/1992 |
| JP | 07-258578 | 10/1995 |
| JP | 08-003498 | 1/1996 |
| JP | 08-283596 | 10/1996 |
| JP | 10-110110 | 4/1998 |
| JP | 10-110111 | 4/1998 |
| JP | 10-110114 | 4/1998 |
| JP | 10-120958 | 5/1998 |
| JP | 10-195331 | 7/1998 |
| JP | 10-195360 | 7/1998 |
| JP | 10-237349 | 9/1998 |
| JP | 10-330665 | 12/1998 |
| JP | 2000-044858 | 2/2000 |
| JP | 2005-220352 | 8/2005 |

OTHER PUBLICATIONS

English Patent Abstract of Publication No. 03-056573 Published Mar. 12, 1991.
English Patent Abstract of Publication No. 03-079678 Published Apr. 4, 1991.
English Patent Abstract of Publication No. 03-160068 Published Jul. 10, 1991.
English Patent Abstract of Publication No. 04-018462 Published Jan. 22, 1992.
English Patent Abstract of Publication No. 08-283596 Published Oct. 29, 1996.
English Patent Abstract of Publication No. 10-120958 Published May 12, 1998.
English Patent Abstract of Publication No. 10-195331 Published Jul. 28, 1998.
English Patent Abstract of Publication No. 10-330665 Published Dec. 15, 1998.

* cited by examiner

*Primary Examiner* — Xiao Zhao
(74) *Attorney, Agent, or Firm* — Harness, Dickey & Pierce, P.L.C.

(57) ABSTRACT

An ink jet printing method includes forming an image by discharging droplets of an aqueous ink composition onto a non-ink-absorbing or low ink-absorbing recording medium by ink jet printing, and drying the aqueous ink composition on the recording medium during and/or after forming the image, wherein the aqueous ink composition contains a water-insoluble colorant, resin particles, a silicone surfactant, an acetylene glycol surfactant, a pyrrolidone derivative, a 1,2-alkyldiol, a polyhydric alcohol, and water, and the resin particles contain resin fixative particles and wax particles.

19 Claims, No Drawings

INK JET PRINTING METHOD

BACKGROUND

1. Technical Field

The present invention relates to an ink jet printing method.

2. Related Art

Solvent-based pigment ink has been used for non-ink-absorbing recording media, such as a poly(vinyl chloride) substrate. Although solvent-based pigment ink has excellent drying characteristics and is resistant to water, volatilization of solvents during the formation of an image on a recording medium causes malodor and toxicological problems. From the standpoints of safety and environmental protection, aqueous ink is becoming increasingly common also for non-ink-absorbing and low ink-absorbing recording media.

The following patent documents describe some methods for forming images on non-ink-absorbing or low ink-absorbing recording media by ink jet printing using aqueous ink. JP-A-2000-44858 discloses a method for printing images on a hydrophobic surface using an ink that contains water, a glycol solvent, an insoluble colorant, a polymer dispersant, a silicon or fluorinated surfactant, a water-insoluble graft copolymer binder, and N-methylpyrrolidone. JP-A-2005-220352 discloses an aqueous ink jet ink containing polymer colloid to be applied to nonporous substrates. The aqueous ink jet ink contains an aqueous liquid vehicle containing a volatile cosolvent having a boiling point of 285° C. or less, acid functional polymer colloid particles, and a pigment colorant.

However, images formed on non-ink-absorbing or low ink-absorbing recording media with previously devised aqueous ink have insufficient abrasion resistance. Thus, there is a demand for an ink jet printing method by which abrasion-resistant images can be formed. Furthermore, because previously devised inks contain large amounts of solvents having relatively high boiling points, the inks may dry slowly, and the printing speed cannot be increased.

SUMMARY

An advantage of some aspects of the invention is that it provides an ink jet printing method for forming an abrasion-resistant image on a non-ink-absorbing or low ink-absorbing recording medium by ink jet printing using aqueous ink having excellent drying characteristics.

An ink jet printing method according to the invention includes forming an image by discharging droplets of an aqueous ink composition onto a non-ink-absorbing or low ink-absorbing recording medium by ink jet printing, and drying the aqueous ink composition on the recording medium during and/or after forming the image, wherein the aqueous ink composition contains a water-insoluble colorant, resin particles, a silicone surfactant, an acetylene glycol surfactant, a pyrrolidone derivative, a 1,2-alkyldiol, a polyhydric alcohol, and water, and the resin particles contain resin fixative particles and wax particles.

In an ink jet printing method according to an aspect of the invention, the wax particles may be polyolefin wax particles.

In an ink jet printing method according to another aspect of the invention, the drying the aqueous ink composition may include heating the recording medium to a temperature in the range of 40° C. to 80° C. and/or blowing air at a temperature in the range of 40° C. to 80° C. toward the aqueous ink composition deposited on the recording medium.

In an ink jet printing method according to still another aspect of the invention, the aqueous ink composition may have a printing resolution of 360 dots per inch (dpi) or more, and the ratio of ink jet nozzle resolution to printing resolution may range from one to two.

In an ink jet printing method according to still another aspect of the invention, the aqueous ink composition may have a viscosity in the range of 1.5 to 15 mPa·s at 20° C.

In an ink jet printing method according to still another aspect of the invention, the aqueous ink composition may contain 0.1% to 1.5% by mass of a silicone surfactant.

In an ink jet printing method according to still another aspect of the invention, the aqueous ink composition may contain 0.1% to 1.0% by mass of an acetylene glycol surfactant.

In an ink jet printing method according to still another aspect of the invention, the aqueous ink composition may contain 1.0% to 8.0% by mass of a pyrrolidone derivative and 1.0% to 8.0% by mass of a 1,2-alkyldiol, and the total amount of pyrrolidone derivative and 1,2-alkyldiol may be 10.0% by mass or less.

In an ink jet printing method according to still another aspect of the invention, the pyrrolidone derivative may be 2-pyrrolidone.

In an ink jet printing method according to still another aspect of the invention, the 1,2-alkyldiol may include an alkyl group having 4 to 8 carbon atoms.

In an ink jet printing method according to still another aspect of the invention, the polyhydric alcohol may be at least one selected from the group consisting of ethylene glycol, diethylene glycol, triethylene glycol, propylene glycol, and dipropylene glycol.

DESCRIPTION OF EXEMPLARY EMBODIMENTS

Preferred embodiments of the invention will be described in detail below.

1. Ink Jet Printing Method

An ink jet printing method according to the present embodiment includes forming an image by discharging droplets of an aqueous ink composition onto a non-ink-absorbing or low ink-absorbing recording medium by ink jet printing; and drying the aqueous ink composition on the recording medium during and/or after forming the image, wherein the aqueous ink composition contains a water-insoluble colorant, resin particles, a silicone surfactant, an acetylene glycol surfactant, a pyrrolidone derivative, a 1,2-alkyldiol, a polyhydric alcohol, and water, and the resin particles contain resin fixative particles and wax particles.

An aqueous ink composition used in an ink jet printing method according to the present embodiment will be described below.

1.1 Aqueous Ink Composition

1.1.1 Colorant

An aqueous ink composition for use in a printing method according to the present embodiment contains a water-insoluble colorant. The water-insoluble colorant may be a water-insoluble dye or a pigment and is preferably a pigment. Pigments are not only insoluble or negligibly soluble in water, but also resist fading caused by light or gas. Printed matter printed with an ink composition containing a pigment resists water, gas, and light and has high storage stability.

Examples of pigments include known inorganic pigments, organic pigments, and carbon black. Among others, carbon black and organic pigments are preferred because these pigments exhibit improved color reproduction and rarely precipitate during dispersion owing to their low specific gravities.

Preferred examples of carbon black include furnace black, lamp black, acetylene black, and channel black (C.I. Pigment black 7), and commercial products, such as No. 2300, 900, MCF88, No. 20B, No. 33, No. 40, No. 45, No. 52, MA7, MA8, MA100, and No. 2200B (trade names, manufactured by Mitsubishi Chemical Co.), Color Black FW1, FW2, FW2V, FW18, FW200, S150, S160, and S170, Printex 35, U, V, and 140U, Special Black 6, 5, 4A, 4, and 250 (trade names, manufactured by Degussa AG), Conductex SC, Raven 1255, 5750, 5250, 5000, 3500, 1255, and 700 (trade names, manufactured by Columbian Chemicals Co.), Regal 400R, 330R, and 660R, Mogul L, Monarch 700, 800, 880, 900, 1000, 1100, 1300, and 1400, and Elftex 12 (trade names, manufactured by Cabot Co.). These carbon blacks are only examples suitable for the invention, and the invention is not limited to these carbon blacks. These carbon blacks may be used alone or in combination. A black ink composition can contain 0.5% to 20% by mass, preferably 1% to 10% by mass, of carbon black.

Preferred organic pigments include quinacridone, quinacridone quinone, dioxazine, phthalocyanine, anthrapyrimidine, anthanthrone, indanthrone, flavanthrone, perylene, diketopyrrolopyrrole, perinone, quinophthalone, anthraquinone, thioindigo, benzimidazolone, isoindolinone, azomethine, and azo pigments.

The following are specific examples of organic pigments for use in an aqueous ink composition according to the invention.

Pigments for use in a cyan ink composition include C.I. Pigment Blue 1, 2, 3, 15:3, 15:4, 15:34, 16, 22, and 60 and C.I. Vat Blue 4 and 60, and preferably include one or at least two selected from the group consisting of C.I. Pigment Blue 15:3, 15:4, and 60. A cyan ink composition can contain approximately 0.5% to 20% by mass, preferably approximately 1% to 10% by mass, of these pigments.

Pigments for use in a magenta ink composition include C.I. Pigment Red 5, 7, 12, 48(Ca), 48(Mn), 57(Ca), 57:1, 112, 122, 123, 168, 184, and 202 and C.I. Pigment Violet 19, and preferably include one or at least two selected from the group consisting of C.I. Pigment Red 122, 202, and 209 and C.I. Pigment Violet 19. A magenta ink composition can contain approximately 0.5% to 20% by mass, preferably approximately 1% to 10% by mass, of these pigments.

Pigments for use in an yellow ink composition include C.I. Pigment Yellow 1, 2, 3, 12, 13, 14C, 16, 17, 73, 74, 75, 83, 93, 95, 97, 98, 109, 110, 114, 128, 129, 138, 150, 151, 154, 155, 180, and 185, and preferably include one or at least two selected from the group consisting of C.I. Pigment Yellow 74, 109, 110, 128, and 138. A yellow ink composition can contain approximately 0.5% to 20% by mass, preferably 1% to 10% by mass, of these pigments.

Pigments for use in an orange ink composition include C.I. Pigment Orange 36 and 43 and mixtures thereof. An orange ink composition can contain approximately 0.5% to 20% by mass, preferably 1% to 10% by mass, of these pigments.

Pigments for use in a green ink composition include C.I. Pigment Green 7 and 36 and mixtures thereof. A green ink composition can contain approximately 0.5% to 20% by mass, preferably 1% to 10% by mass, of these pigments.

To use these pigments in an aqueous ink composition, the pigments must be stably dispersed in water. The pigment can be dispersed by using a resin dispersant, such as a water-soluble resin and/or a water-dispersible resin ("resin-dispersed pigment"), by using a surfactant, such as a water-soluble surfactant and/or a water-dispersible surfactant ("surfactant-dispersed pigment"), or by chemically and/or physically introducing a hydrophilic functional group on the pigment surface to disperse and/or dissolve the pigment in water without using the resin dispersant or the surfactant ("surface-treated pigment"). An aqueous ink composition for use in a printing method according to the present embodiment can contain the resin-dispersed pigment, the surfactant-dispersed pigment, the surface-treated pigment, or a combination thereof.

Examples of the resin dispersant used for the resin-dispersed pigment include poly(vinyl alcohol), polyvinylpyrrolidone, poly(acrylic acid), an acrylic acid-acrylonitrile copolymer, a vinyl acetate-acrylate copolymer, an acrylic acid-acrylate copolymer, a styrene-acrylic acid copolymer, a styrene-methacrylic acid copolymer, a styrene-methacrylic acid-acrylate copolymer, a styrene-α-methylstyrene-acrylic acid copolymer, a styrene-α-methylstyrene-acrylic acid-acrylate copolymer, a styrene-maleic acid copolymer, a styrene-maleic anhydride copolymer, a vinylnaphthalene-acrylic acid copolymer, a vinylnaphthalene-maleic acid copolymer, a vinyl acetate-maleate copolymer, a vinyl acetate-crotonic acid copolymer, a vinyl acetate-acrylic acid copolymer, and salts thereof. Among others, copolymers composed of monomers having a hydrophobic functional group and monomers having a hydrophilic functional group, and polymers composed of monomers having a hydrophobic functional group and a hydrophilic functional group are preferred. The copolymers may be random copolymers, block copolymers, alternating copolymers, or graft copolymers.

Examples of the salts include salts with basic compounds, such as ammonia, ethylamine, diethylamine, triethylamine, propylamine, isopropylamine, dipropylamine, butylamine, isobutylamine, diethanolamine, triethanolamine, tri-iso-propanolamine, aminomethylpropanol, and morpholine. The amount of basic compound is equal to or more than the neutralization equivalent of the resin dispersant.

The resin dispersant preferably has a weight-average molecular weight in the range of 1,000 to 100,000, more preferably 3,000 to 10,000. With the resin dispersant having a molecular weight in these ranges, a colorant can be stably dispersed in water, and the viscosity of an aqueous ink composition containing such a colorant is easily controllable.

The resin dispersant preferably has an acid value in the range of 50 to 300, more preferably 70 to 150. With the resin dispersant having an acid value in these ranges, a colorant can be stably dispersed in water, and printed matter printed with an aqueous ink composition containing such a colorant has high water resistance.

The resin dispersant may be commercially available. Specific examples of commercially available resin dispersants include Joncryl 67 (weight-average molecular weight: 12,500, acid value: 213), Joncryl 678 (weight-average molecular weight: 8,500, acid value: 215), Joncryl 586 (weight-average molecular weight: 4,600, acid value: 108), Joncryl 611 (weight-average molecular weight: 8,100, acid value: 53), Joncryl 680 (weight-average molecular weight: 4,900, acid value: 215), Joncryl 682 (weight-average molecular weight: 1,700, acid value: 238), Joncryl 683 (weight-average molecular weight: 8,000, acid value: 160), and Joncryl 690 (weight-average molecular weight: 16,500, acid value: 240) (trade names, manufactured by BASF Japan Ltd.).

Examples of surfactants used for the surfactant-dispersed pigment include anionic surfactants, such as alkanesulfonates, α-olefin sulfonates, alkylbenzenesulfonates, alkylnaphthalenesulfonates, acylmethyl taurinate, dialkylsulfosuccinates, alkyl sulfate ester salts, sulfonated olefins, polyoxyethylene alkyl ether sulfate ester salts, alkyl phosphate ester salts, polyoxyethylene alkyl ether phosphate ester salts, and monoglyceride phosphate ester salts, amphoteric surfactants, such as alkylpyridinium salts, alkylamino acid salts, and alkyldimethylbetaines, and nonionic surfactants, such as polyoxyethylene alkyl ethers, polyoxyethylene alkylphenyl ethers, polyoxyethylene alkyl esters, polyoxyethylene alkylamides, alkyl glycerides, and sorbitan alkyl esters.

The amount of resin dispersant or surfactant preferably ranges from 1 to 100 parts by mass, more preferably 5 to 50 parts by mass, per 100 parts by mass of pigment. In these ranges, the pigment can be stably dispersed in water.

Examples of the hydrophilic functional group of the surface-treated pigment include —OM, —COOM, —CO—, —SO$_3$M, —SO$_2$NH$_2$, —RSO$_2$M, —PO$_3$HM, —PO$_3$M$_2$, —SO$_2$NHCOR, —NH$_3$, and —NR$_3$ (wherein M denotes a hydrogen atom, an alkali metal, ammonium, or an organic ammonium, and R denotes an alkyl group having 1 to 12 carbon atoms, an optionally substituted phenyl group, or an optionally substituted naphthyl group). The functional group is physically and/or chemically introduced directly and/or indirectly through another group onto the pigment surface. That other group may be an alkylene group having 1 to 12 carbon atoms, an optionally substituted phenylene group, or an optionally substituted naphthylene group.

Preferably, the surface-treated pigment is a pigment that is treated with a surface-treating agent containing sulfur so that —SO$_3$M and/or —RSO$_2$M (wherein M denotes a counter ion, a hydrogen ion, an alkali metal ion, an ammonium ion, or an organic ammonium ion) is chemically bonded to the surface; more specifically, a pigment dispersed in a solvent that has no active proton, has no reactivity to sulfonic acid, and does not or negligibly dissolves the pigment is treated with amidosulfuric acid or a complex between sulfur trioxide and a tertiary amine so that —SO$_3$M and/or —RSO$_2$M is chemically bonded to the pigment surface, allowing the resulting surface-treated pigment to be dispersed and/or dissolved in water.

The functional group or a salt thereof can be grafted directly or indirectly through another group onto the pigment surface by a known surface treatment. For example, commercially available oxidized carbon black is further oxidized by ozone or sodium hypochlorite solution to increase the hydrophilicity of carbon black (for example, JP-A-7-258578, JP-A-8-3498, JP-A-10-120958, JP-A-10-195331, and JP-A-10-237349); carbon black is treated with 3-amino-N-alkyl-substituted pyridinium bromide (for example, JP-A-10-195360 and JP-A-10-330665); an organic pigment dispersed in a solvent that does not or negligibly dissolves the organic pigment is treated with a sulfonating agent to introduce a sulfone group on the pigment surface (for example, JP-A-8-283596, JP-A-10-110110, and JP-A-10-110111); or an organic pigment dispersed in a basic solvent that can form a complex with sulfur trioxide is treated with sulfur trioxide to introduce a sulfone group or a sulfonamino group (for example, JP-A-10-110114). The surface-treated pigment for use in the invention may be manufactured by another method.

A single or a plurality of functional groups can be grafted on a pigment particle. The type and amount of functional group to be grafted on pigment particles may be appropriately determined in consideration of the dispersion stability of the pigment particles in ink, color density, and drying characteristics of ink in the front of an ink jet head.

The resin-dispersed pigment, the surfactant-dispersed pigment, and the surface-treated pigment can be dispersed in water in the following manner. A pigment, water, and a resin dispersant in the case of the resin-dispersed pigment, a pigment, water, and a surfactant in the case of the surfactant-dispersed pigment, or a surface-treated pigment and water in the case of the surface-treated pigment, optionally together with a water-soluble organic solvent and/or a neutralizing agent, can be dispersed in a known dispersing apparatus, such as a ball mill, a sand mill, an attritor, a rolling mill, an agitator mill, a Henschel mixer, a colloid mill, an ultrasonic homogenizer, a jet mill, or Angmill (trade name). Pigment particles are preferably dispersed to an average particle size in the range of 20 to 500 nm, more preferably 50 to 200 nm, to ensure stable dispersion of the pigment particles in water.

1.1.2 Resin Particles

An aqueous ink composition for use in a printing method according to the present embodiment contains resin particles. The resin particles solidify ink and firmly fix the solidified ink on a recording medium in a process for drying an aqueous ink composition described below. Thus, printed matter printed with an aqueous ink composition containing the resin particles has high abrasion resistance on non-ink-absorbing and low ink-absorbing recording media. Preferably, an aqueous ink composition for use in a printing method according to the present embodiment contains resin particle emulsion or suspension. The resin particle emulsion or suspension allows the viscosity of the aqueous ink composition to be appropriately controlled in a printing method according to the present embodiment, ensuring the storage stability and the discharge stability of the aqueous ink composition.

An aqueous ink composition for use in a printing method according to the present embodiment contains resin fixative particles and wax particles as resin particles. The resin fixative particles form a resin film to fix printed matter on a recording medium in a process for drying an aqueous ink composition described below. The wax particles impart a smooth and shiny surface to printed matter to improve the abrasion resistance of the printed matter. The resin fixative particles and the wax particles will be described in detail below.

The resin fixative particles may be formed of polyacrylate or a copolymer thereof, polymethacrylate or a copolymer thereof, polyacrylonitrile or a copolymer thereof, polycyanoacrylate, polyacrylamide, poly(acrylic acid), poly(methacrylic acid), polyethylene, polypropylene, polybutene, polyisobutylene, polystyrene or a copolymer thereof, a petroleum resin, a coumarone-indene resin, a terpene resin, poly(vinyl acetate) or a copolymer thereof, poly(vinyl alcohol), poly(vinyl acetal), poly(vinyl ether), poly(vinyl chloride) or a copolymer thereof, poly(vinylidene chloride), a fluorocarbon resin, fluorocarbon rubber, polyvinylcarbazole, polyvinylpyrrolidone or a copolymer thereof, polyvinylpyridine, polyvinylimidazole, polybutadiene or a copolymer thereof, polychloroprene, polyisoprene, or a natural resin. Preferably, the resin fixative particles are formed of a component having both a hydrophobic moiety and a hydrophilic moiety in its molecular structure.

The resin fixative particles may be manufactured by known methods using known materials (see, for example, JP-B-62-1426 and JP-A-3-56573, JP-A-3-79678, JP-A-3-160068, and JP-A-4-18462). The resin fixative particles may be a commercial product, for example, Microgel E-1002 or E-5002 (trade names, manufactured by Nippon Paint Co., Ltd.), Voncoat 4001 or 5454 (trade names, manufactured by Dainippon Ink and Chemicals, Inc.), SAE1014 (trade name, manufactured by ZEON Co.), Saibinol SK-200 (trade name, manufactured by Saiden Chemical Industry Co., Ltd.), or Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade names, manufactured by BASF Japan Ltd.).

The resin fixative particles can be manufactured by any of the following methods alone or in combination. In one method, monomers composing desired resin fixative particles are polymerized in the presence of a polymerization catalyst (polymerization initiator) and a dispersant (emulsion polymerization). In another method, a solution of a resin fixative having a hydrophilic moiety in a water-soluble organic solvent is mixed with water, and the water-soluble organic solvent is then removed by distillation. In still another method, a solution of a resin fixative in a water-insoluble organic solvent and a dispersant are mixed in an aqueous solution. These methods are appropriately selected in accordance with the type and characteristics of the resin fixative. Examples of a dispersant for dispersing the resin fixative include, but not limited to, anionic surfactants (for example, sodium dodecylbenzenesulfonate, sodium lauryl phosphate, and polyoxyethylene alkyl ether sulfate ammonium salts), nonionic surfactants (for example, polyoxyethylene alkyl ethers, polyoxyethylene alkyl esters, polyoxyethylene sorbitan fatty acid esters, and polyoxyethylene alkylphenyl ethers). These dispersants can be used alone or in combination.

The resin fixative particles must contain at least one component having a glass transition temperature (Tg) of room temperature or higher (approximately 30° C. or more). A component having a Tg of room temperature or higher can increase the strength of a resin film in a process for drying an aqueous ink composition described below, thereby improving the abrasion resistance of printed matter, and prevent nozzle clogging of an ink jet head. By contrast, resin fixative particles only composed of components having a Tg lower than room temperature may form a weak resin film, resulting in low abrasion resistance of printed matter, and may cause nozzle clogging.

Examples of the components of the wax particles include plant and animal wax, such as carnauba wax, candelilla wax, beeswax, rice wax, and lanolin; petroleum wax, such as paraffin wax, microcrystalline wax, polyethylene wax, oxidized polyethylene wax, and petrolatum; mineral wax, such as montan wax, and ozokerite; synthetic wax, such as carbon wax, Hoechst wax, polyolefin wax, and stearamide; natural and synthetic wax emulsion, such as α-olefin-maleic anhydride copolymer emulsion; and compound wax. These components can be used alone or in combination. Among others, polyolefin wax, particularly polyethylene wax and polypropylene wax, is preferred. The wax particles may be a commercial product, for example, Nopcote PEM17 (trade name, manufactured by San Nopco Ltd.), Chemipearl W4005 (trade name, manufactured by Mitsui Chemicals, Inc.), or Aquacer 515 or 593 (trade names, manufactured by BYK Japan KK).

The resin particles preferably have an average size in the range of 5 to 400 nm, more preferably 50 to 200 nm, to ensure the storage stability and the discharge stability of an aqueous ink composition.

An aqueous ink composition preferably contains 0.1% to 15% by mass, more preferably 0.5% to 10% by mass, of resin particles based on solid content. In these ranges, an aqueous ink composition for use in a printing method according to the present embodiment can be solidified and fixed even on a non-ink-absorbing or low ink-absorbing recording medium. At a resin particle solid content below 0.1% by mass, insufficiently solidified ink is weakly fixed on a non-ink-absorbing or low ink-absorbing recording medium and may be easily detached from the medium. At a resin particle solid content above 15% by mass, an aqueous ink composition may have low storage stability and discharge stability.

Although the reason that the combined use of resin fixative particles and wax particles improves the abrasion resistance of printed matter is not clear, the following is a possible reason. Because the components of resin fixative particles have a high affinity for a non-ink-absorbing or low ink-absorbing recording medium and a water-insoluble colorant, the components are firmly fixed on the recording medium while enclosing the colorant in a process for drying an aqueous ink composition. At the same time, the components of wax particles reduce the frictional resistance of a resin film. The resin film is resistant to friction and is rarely detached from the recording medium, thus improving the abrasion resistance of printed matter.

The ratio of resin fixative particles to wax particles in resin particles preferably ranges from 1:1 to 5:1 based on solid content. In this range, the mechanism described above functions successfully to improve the abrasion resistance of printed matter.

1.1.3 Silicone Surfactant

An aqueous ink composition for use in a printing method according to the present embodiment contains a silicone surfactant. A silicone surfactant uniformly spreads ink on a recording medium to prevent inconsistencies in density and bleeding of ink. An aqueous ink composition preferably contains 0.1% to 1.5% by mass of a silicone surfactant. Less than 0.1% by mass of a silicone surfactant is insufficient to spread ink on a recording medium, often resulting in inconsistencies in density or bleeding of ink. More than 1.5% by mass of a silicone surfactant may result in low storage stability and discharge stability of an aqueous ink composition.

The silicone surfactant is preferably a polysiloxane compound, for example, polyether-modified organosiloxane. Specific examples of the silicone surfactant include BYK-306, BYK-307, BYK-333, BYK-341, BYK-345, BYK-346, and BYK-348 (trade names, manufactured by BYK Japan KK), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, manufactured by Shin-Etsu Chemical Co., Ltd.).

1.1.4 Acetylene Glycol Surfactant

An aqueous ink composition for use in a printing method according to the present embodiment contains an acetylene glycol surfactant. An acetylene glycol surfactant is superior in ability to maintain proper surface tension and interfacial tension to the other surfactants, and produces little foam. An aqueous ink composition containing an acetylene glycol surfactant can therefore maintain proper surface tension and interface tension between ink and a printer component in contact with ink, such as a head nozzle surface. Such an aqueous ink composition containing an acetylene glycol surfactant can improve discharge stability in ink jet printing. An aqueous ink composition containing an acetylene glycol surfactant has high wettability and permeability to recording media, thus providing high-resolution images with reduced occurrence of inconsistencies in density and bleeding of ink. An aqueous ink composition preferably contains 0.1% to 1.0% by mass of an acetylene glycol surfactant. Less than 0.1% by mass of an acetylene glycol surfactant is insufficient to spread ink on a recording medium, often causing inconsistencies in density and bleeding of ink. More than 1.0% by mass of an acetylene glycol surfactant may result in low storage stability and discharge stability of an aqueous ink composition.

Examples of the acetylene glycol surfactant include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, and GA (trade names, manufactured by Air products and Chemicals. Inc.), Olfin B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (trade names, manufactured by Nissin Chemical Industry Co., Ltd.), and Acetylenol E00, E00P, E40, and E100 (trade names, manufactured by Kawaken Fine Chemicals Co., Ltd.).

1.1.5 Pyrrolidone Derivative

An aqueous ink composition for use in a printing method according to the present embodiment contains a pyrrolidone derivative. A pyrrolidone derivative functions as a solubilizer or a softener for the resin components described above and the surface of ink fixed on a non-ink-absorbing or low ink-absorbing recording medium. A pyrrolidone derivative promotes the film formation of resin fixative particles during an ink drying process and promotes the solidification and fixation of ink on a non-ink-absorbing or low ink-absorbing recording medium. An aqueous ink composition preferably contains 1% to 8% by mass of a pyrrolidone derivative. Less than 1% by mass of a pyrrolidone derivative may compromise the formation of a film from the resin components of an aqueous ink composition, resulting in insufficient solidification and fixation of ink. At a pyrrolidone derivative content above 8% by mass, a pyrrolidone derivative may partly remain even after a process for drying an aqueous ink composition described below (drying process), resulting in incompletely dried printed matter and causing malodor.

Examples of the pyrrolidone derivative include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. In particular, 2-pyrrolidone is preferred because 2-pyrrolidone ensures high storage stability of an aqueous ink composition, promotes the formation of a film from a resin fixative, and causes relatively weak malodor.

1.1.6 1,2-alkyldiol

An aqueous ink composition for use in a printing method according to the present embodiment contains a 1,2-alkyldiol. In synergy with the silicone surfactant and the acetylene glycol surfactant described above, a 1,2-alkyldiol further increases the wettability of an aqueous ink composition on a recording medium. A 1,2-alkyldiol in an aqueous ink composition can further decrease inconsistencies in density and bleeding of ink. An aqueous ink composition preferably contains 1% to 8% by mass of a 1,2-alkyldiol. Less than 1% by mass of a 1,2-alkyldiol may result in low wettability of an aqueous ink composition on a recording medium, causing inconsistencies in density and bleeding in printed matter. At a 1,2-alkyldiol content above 8% by mass, a 1,2-alkyldiol may partly remain even after a process for drying an aqueous ink composition described below (drying process), resulting in incompletely dried printed matter and causing malodor. Preferably, the total amount of pyrrolidone derivative and 1,2-alkyldiol is 10% by mass or less of the total amount of aqueous ink composition. When the total amount of pyrrolidone derivative and 1,2-alkyldiol exceeds 10% by mass, a pyrrolidone derivative and a 1,2-alkyldiol may partly remain even after a process for drying an aqueous ink composition described below (drying process), resulting in incompletely dried printed matter and causing malodor.

Examples of a 1,2-alkyldiol include 1,2-alkyldiols having 4 to 8 carbon atoms, such as butanediol, pentanediol, hexanediol, heptanediol, and octanediol, preferably 1,2-alkyldiols having 6 to 8 carbon atoms, such as 1,2-hexanediol, 1,2-heptanediol, and 1,2-octanediol. A 1,2-alkyldiol having less than 4 carbon atoms may result in low wettability of an aqueous ink composition on a recording medium, causing inconsistencies in density and bleeding in printed matter. A 1,2-alkyldiol having more than 8 carbon atoms may have low water solubility, making it difficult to add a required amount of 1,2-alkyldiol or lowering the storage stability of ink.

1.1.7 Polyhydric Alcohol

An aqueous ink composition for use in a printing method according to the present embodiment contains a polyhydric alcohol. A polyhydric alcohol can prevent ink from being solidified or dried at a nozzle surface of an ink jet head, thereby preventing clogging and poorly controlled discharge. A polyhydric alcohol therefore preferably has a high vapor pressure. This is because it is desirable that a polyhydric alcohol, together with water, evaporate in a process for drying an aqueous ink composition described below. An aqueous ink composition preferably contains 2% to 20% by mass of polyhydric alcohol. An aqueous ink composition containing an amount of polyhydric alcohol in this range can produce the effects described above. Less than 2% by mass of polyhydric alcohol may be insufficient to produce the effects. At a polyhydric alcohol content above 20% by mass, a polyhydric alcohol may partly remain even after a process for drying an aqueous ink composition described below (drying process), resulting in incompletely dried printed matter and causing malodor.

Examples of the polyhydric alcohol include ethylene glycol, diethylene glycol, triethylene glycol, propylene glycol, dipropylene glycol, 1,3-propanediol, and 1,4-butanediol. Among others, ethylene glycol, diethylene glycol, triethylene glycol, propylene glycol, and dipropylene glycol are preferred because they have a high vapor pressure and do not interfere with the drying characteristics of an aqueous ink composition.

1.1.8 Water

An aqueous ink composition for use in a printing method according to the present embodiment contains water. Water is the main medium of the aqueous ink composition and evaporates in a drying process described below.

Preferably, water contains only a minimal amount of ionic impurities and is, for example, pure water or ultrapure water, such as ion-exchanged water, ultrafiltered water, reverse osmosis water, or distilled water. Preferably, water is sterilized, for example, by ultraviolet irradiation or the addition of hydrogen peroxide to prevent the generation of mold or bacteria. A pigment dispersion that contains sterilized water and an aqueous ink composition that contains such a pigment dispersion can be stored for a long period of time.

1.1.9 Other Additive Components

An aqueous ink composition for use in a printing method according to the present embodiment contains a colorant, resin particles, a silicone surfactant, an acetylene glycol surfactant, a pyrrolidone derivative, a 1,2-alkyldiol, and water, as described above. Such an aqueous ink composition has weak malodor during a print process and excellent drying characteristics, and can form abrasion-resistant images even on plastic films with reduced occurrence of inconsistencies in density and bleeding. To further improve its performance, the aqueous ink composition can further contain a penetrating solvent, a humectant, a preservative and fungicide, a pH-adjusting agent, and/or a chelator.

A penetrating solvent further improves the wettability of an aqueous ink composition on a recording medium. A penetrating solvent can therefore further decrease inconsistencies in density and bleeding of ink in a formed image. Examples of the penetrating solvent include glycol ethers and monohydric alcohols.

Examples of glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-iso-propyl ether.

Examples of monohydric alcohols include water-soluble monohydric alcohols, such as methanol, ethanol, n-propyl alcohol, iso-propyl alcohol, 2,2-dimethyl-1-propanol, n-butanol, 2-butanol, tert-butanol, iso-butanol, 2-methyl-1-butanol, 3-methyl-1-butanol, 3-methyl-2-butanol, n-pentanol, 2-pentanol, 3-pentanol, and tert-pentanol.

An aqueous ink composition preferably contains 10% by mass or less, more preferably 8% by mass or less, of penetrating solvent.

A humectant can decrease the evaporation of water from an aqueous ink composition to prevent the aggregation of solid contents of ink, such as pigments and a resin fixative. Examples of the humectant include glycerin, tetraethylene glycol, polyethylene glycol, polypropylene glycol, 1,5-pentanediol, 2,3-butanediol, 2-methyl-2,4-pentanediol, 2-ethyl-1,3-hexanediol, 1,2,6-hexanetriol, pentaerythritol, 1,6-hexanediol, 1,8-octanediol, 2,2-dimethyl-1,3-propanediol, 2,2-diethyl-1,3-propanediol, trimethylolethane, trimethylolpropane, urea, 2-imidazolidinone, thiourea, and 1,3-dimethyl-2-imidazolidinone.

An aqueous ink composition preferably contains less than 10% by mass, more preferably 5% by mass or less, of humectant. Ten percent by mass or more of humectant may excessively retard the drying of ink or prevent resin fixative particles from forming a film. This may prevent the solidification and fixation of ink on a recording medium, and therefore a printed surface may detach from printed matter.

Examples of the pH-adjusting agent include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium hydrogencarbonate.

Examples of the preservative and fungicide include sodium benzoate, sodium pentachlorophenol, sodium 2-pyridinethiol-1-oxide, sodium sorbate, sodium dehydroacetate, and 1,2-dibenzisothiazolin-3-one. The preservative and fungicide may be a commercial product, such as Proxel XL2 or GXL (trade names, manufactured by Avecia Ltd.) or Denicide CSA or NS-500W (trade names, manufactured by Nagase ChemteX Co.).

Examples of the anticorrosive include benzotriazole.

Examples of the chelator include ethylenediaminetetraacetic acid and salts thereof (disodium dihydrogen ethylenediaminetetraacetate).

1.1.10 Physical Properties of Aqueous Ink Composition

An aqueous ink composition is preferably neutral or alkaline and more preferably has a pH in the range of 7.0 to 10.0. An aqueous ink composition having an acidic pH may have low storage stability and dispersion stability. Furthermore, an aqueous ink composition having an acidic pH is likely to cause defects, such as corrosion, in metal parts of an ink path in an ink jet printer. The pH of an aqueous ink composition can be adjusted to neutral or alkaline with the pH-adjusting agent.

Preferably, an aqueous ink composition has a viscosity in the range of 1.5 to 15 mPa·s at 20° C. An aqueous ink composition having a viscosity in this range has high discharge stability in a process for forming an image described below.

An aqueous ink composition preferably has a surface tension of 20 or more but less than 40 mN/m, more preferably in the range of 25 to 35 mN/m, at 25° C. An aqueous ink composition having a surface tension in these ranges has high discharge stability in a process for forming an image described below and has proper wettability on non-ink-absorbing and low ink-absorbing recording media.

1.1.11 Method for Manufacturing Aqueous Ink Composition

An aqueous ink composition for use in a printing method according to the present embodiment is manufactured by mixing the materials described above in any order and, if necessary, filtering the mixture to remove impurities. For convenience in handling, preferably, a colorant is uniformly dispersed in an aqueous medium before the materials are mixed.

Preferably, the materials are sequentially charged and mixed in a container provided with an agitator, such as a mechanical stirrer or a magnetic stirrer. If necessary, filtration may be performed by centrifugal filtration or filter filtration.

1.2 Printing Process

The processes of an ink jet printing method according to the present embodiment will be described in detail below.

1.2.1 Process for Forming Image

A process for forming an image in a printing method according to the present embodiment involves forming an image by discharging droplets of the aqueous ink composition described above onto a non-ink-absorbing or low ink-absorbing recording medium by ink jet printing.

Ink jet printing may be any printing by which droplets of the aqueous ink composition are discharged from a fine nozzle and adhere to a recording medium. Examples of ink jet printing include the following four modes.

A first mode is electrostatic attraction, in which a strong electric field is applied between a nozzle and an accelerating electrode disposed in front of the nozzle to continuously eject ink droplets from the nozzle. Print information signals are sent to deflection electrodes during flight of ink droplets between deflection electrodes. Alternatively, ink droplets are ejected in response to print information signals without deflection.

In a second mode, ink is pressurized with a small pump, and a nozzle is mechanically oscillated with a crystal oscillator to eject ink droplets. Ink droplets are charged simultaneously with the ejection. Print information signals are sent to deflection electrodes during flight of ink droplets between deflection electrodes.

A third mode uses a piezoelectric element. Pressure and print information signals are simultaneously applied to ink with the piezoelectric element, thereby ejecting ink droplets for printing.

In a fourth mode, ink is rapidly expanded by the action of thermal energy. Ink is heated and foamed with a microelectrode in response to print information signals, thereby ejecting ink droplets for printing.

A recording medium is a non-ink-absorbing or low ink-absorbing recording medium. Examples of the non-ink-absorbing recording medium include plastic films that are not surface-treated for ink jet printing (that is, plastic films having no ink-absorbing layer) and substrates, such as paper, on which a plastic film is coated or laminated. The plastics include poly(vinyl chloride), poly(ethylene terephthalate), polycarbonate, polystyrene, polyurethane, polyethylene, and polypropylene. Examples of the low ink-absorbing recording medium include actual printing paper, such as art paper, coated paper, and matte paper.

The phrase "non-ink-absorbing or low ink-absorbing recording medium", as used herein, refers to a recording medium that absorbs 10 mL/m$^2$ or less of water for a contact time of 30 msec$^{1/2}$ as determined by a Bristow method. The Bristow method is the most widely used method for measuring the amount of absorbed liquid for a short period of time. The Bristow method has also been adopted by Japan Technical Association of the Pulp and Paper Industry (JAPAN TAPPI). The details of the Bristow method is described in specification No. 51 "Kami Oyobi Itagami—Ekitai Kyushusei Siken Houhou—Buristo Hou (Paper and paperboard—liquid absorption test method—Bristow method)" in "JAPAN TAPPI Test Methods", 2000.

In a process for forming an image, an aqueous ink composition preferably has a printing resolution of 360 dots per inch (dpi) or more, and the ratio of ink jet nozzle resolution to printing resolution preferably ranges from one to two. It is desired that printing resolution be at least 360 dpi for the formation of high-quality images. At a printing resolution below 360 dpi, the image quality may deteriorate. When the ratio of ink jet nozzle resolution to printing resolution ranges from one to two, high-speed printing is practicable.

1.2.2 Process for Drying Aqueous Ink Composition

A process for drying an aqueous ink composition in a printing method according to the present embodiment involves drying the aqueous ink composition described above on a recording medium during and/or after the process for forming an image. Through a process for drying an aqueous ink composition, liquid media (more specifically, water, a pyrrolidone derivative, a 1,2-alkyldiol, and a polyhydric alcohol) in the aqueous ink composition deposited on a recording medium evaporate rapidly, and resin fixative particles in the aqueous ink composition form a film. Thus, high-quality images can be formed on non-ink-absorbing recording media having no ink-absorbing layer, such as plastic films, in a short period of time with reduced occurrence of inconsistencies in density and bleeding. The formation of a film formed of resin fixative particles allows dried ink to adhere to a recording medium, thus fixing images.

A process for drying an aqueous ink composition may be any method by which the evaporation of the liquid media in the aqueous ink composition can be promoted. A process for drying an aqueous ink composition may involve heating a recording medium during and/or after a process for forming an image, and/or blowing air toward an aqueous ink composition deposited on a recording medium after a process for forming an image. More specifically, forced-air heating, radiant heating, conduction heating, high-frequency drying, or microwave drying is preferably used.

The heating temperature in a process for drying an aqueous ink composition may be any temperature at which the evaporation of the liquid media in the aqueous ink composition can be promoted. This promoting effect is achievable at a heating temperature of 40° C. or more, preferably in the range of 40° C. to 80° C., more preferably in the range of 40° C. to 60° C. When the heating temperature exceeds 80° C., some recording media have defects, such as deformation, and are therefore difficult to transport after a process for drying an aqueous ink composition, or some recording media cooled to room temperature may have defects, such as contraction.

The heating time in a process for drying an aqueous ink composition may be any time period during which liquid media in the aqueous ink composition can evaporate and a resin fixative can form a film. The heating time is appropriately determined in consideration of the type of liquid medium, the type of resin fixative, and printing speed.

2. Examples

While examples of the invention will be described in detail below, the invention is not limited to these examples.

2.1 Preparation of Aqueous Ink Composition

2.1.1 Preparation of Pigment Dispersion

An aqueous ink composition used in the present example contained a water-insoluble pigment as a colorant. A pigment dispersed with a resin dispersant, that is, a resin-dispersed pigment was added to the aqueous ink composition.

Pigment dispersion was prepared as follows. First, 7.5 parts by mass of acrylic acid-acrylate copolymer (weight-average molecular weight: 25,000, acid value: 180) was dissolved as a resin dispersant in 76 parts by mass of ion-exchanged water containing 1.5 parts by mass of 30% aqueous ammonia (neutralizing agent). Fifteen parts by mass of the following pigment was dispersed in the resulting solution in a ball mill with zirconia beads for 10 hours. Impurities, such as coarse particles and dust, were removed by centrifugal filtration. The pigment concentration was adjusted to 15% by mass. The following pigments were used for the preparation of pigment dispersion.

C.I. Pigment Black 7 (used for black pigment dispersion 1)

prepared in "2.1.1 Preparation of Pigment Dispersion". Ink sets 1 to 9 having different compositions were prepared. These aqueous ink compositions were prepared by mixing the materials shown in Table 1 with a magnetic stirrer in a container for two hours and removing impurities, such as dust and coarse particles, using a membrane filter having a pore size of 5 µm. The values shown in Table 1 are expressed in % by mass. Ion-exchanged water was added such that the total amount of ink was 100% by mass.

TABLE 1

| Material | Ink set composition | | | | | | | | |
|---|---|---|---|---|---|---|---|---|---|
|  | 1 | 2 | 3 | 4 | 5 | 6 | 7 | 8 | 9 |
| Pigment dispersion | 30.00 | 30.00 | 30.00 | 30.00 | 30.00 | 30.00 | 30.00 | 30.00 | 30.00 |
| BYK-348 (silicone surfactant) | 0.50 | 1.50 | 0.30 | 0.80 | 0.10 | 1.00 | — | 1.50 | 0.50 |
| Surfynol DF-110D (acetylene glycol surfactant) | 0.30 | 0.10 | 0.50 | 0.20 | 1.00 | 0.30 | — | — | — |
| Styrene-acrylic acid copolymer emulsion <Tg: 50° C., 50% dispersion liquid> (resin fixative particles) | 2.00 | 2.00 | 6.00 | 4.00 | 1.00 | 15.00 | — | 4.00 | — |
| Styrene-acrylic acid copolymer emulsion <Tg: −15° C., 50% dispersion liquid> (resin fixative particles) | — | 2.00 | — | 8.00 | — | — | 4.00 | — | 8.00 |
| Polyethylene wax emulsion <solid content 35%> (wax particles) | 1.43 | — | 2.86 | 5.71 | 1.43 | 21.43 | — | — | — |
| Polypropylene wax emulsion <solid content 40%> (wax particles) | — | 5.00 | 2.50 | 5.00 | — | — | 2.50 | — | — |
| 2-pyrrolidone (pyrrolidone derivative) | 4.00 | 1.00 | 3.00 | 5.00 | 1.00 | 8.00 | 10.00 | — | 6.00 |
| 1,2-hexanediol (1,2-alkyldiol) | 4.00 | 1.00 | 5.00 | 5.00 | 8.00 | 1.00 | — | 10.00 | 6.00 |
| Propylene glycol (polyhydric alcohol) | 10.00 | 12.00 | 10.00 | 8.00 | 10.00 | 10.00 | 10.00 | 10.00 | — |
| Diethylene glycol (polyhydric alcohol) | — | — | — | — | 1.00 | 1.00 | — | — | 4.00 |
| Triethanolamine (pH adjusting agent) | 0.10 | 0.10 | 0.10 | 0.10 | 0.10 | 0.10 | 0.10 | 0.10 | — |
| Ethylenediaminetetraacetic acid (chelator) | 0.05 | 0.05 | 0.05 | 0.05 | 0.05 | 0.05 | 0.05 | 0.05 | — |
| Benzotriazole (anticorrosive) | 0.02 | 0.02 | 0.02 | 0.02 | 0.02 | 0.02 | 0.02 | 0.02 | — |
| Ion-exchanged water | Balance | Balance | Balance | Balance | Balance | Balance | Balance | Balance | Balance |

C.I. Pigment Yellow 74 (used for yellow pigment dispersion)

C.I. Pigment Red 122 (used for magenta pigment dispersion)

C.I. Pigment Blue 15:3 (used for cyan pigment dispersion)

C.I. Pigment Orange 43 (used for orange pigment dispersion)

C.I. Pigment Green 36 (used for green pigment dispersion)

A colorant to be contained in an aqueous ink composition according to the present example was a surface-treated pigment that was dispersible in water. Pigment dispersion that contained the surface-treated pigment dispersed in water was used for the preparation of an aqueous ink composition. The pigment dispersion was therefore prepared before evaluation described below. First, the surface of carbon black, Color Black S170 (trade name, manufactured by Degussa-Huls AG), was oxidized with sodium hypochlorite to prepare water-dispersible surface-treated carbon black. The surface-treated carbon black was then dispersed in ion-exchanged water to prepare black pigment dispersion 2 having a pigment concentration of 15% by mass.

2.1.2 Preparation of Aqueous Ink Composition

An ink set composed of seven aqueous ink compositions of black 1, black 2, yellow, magenta, cyan, orange, and green shown in Table 1 was prepared using the pigment dispersion In Table 1, a silicone surfactant "BYK-348" is a trade name and is manufactured by BYK Japan KK. An acetylene glycol surfactant "Surfynol DF-110D" is a trade name and is manufactured by Nissin Chemical Industry Co., Ltd. Polyethylene wax emulsion is "AQUACER 515" (trade name, manufactured by BYK Japan KK). Polypropylene wax emulsion is "Nopcote PEM17" (trade name, manufactured by San Nopco Ltd.). The ink set 9 was prepared from the ink compositions described in JP-A-2005-220352.

2.2. Printing Evaluation 2.2.1 Evaluation of Abrasion Resistance

Recording media used were a non-ink-absorbing poly (ethylene terephthalate) film, a cold laminate film PG-50L (trade name, manufactured by Lami Co.), and low ink-absorbing gloss ultra lightweight coated paper, OK Top Coat+(trade name, manufactured by Oji Paper Co., Ltd.).

An ink jet printer used was an ink jet printer PX-G930 (trade name, manufactured by Seiko Epson Co., nozzle resolution: 180 dpi), which has a temperature-variable heater in a paper guide. The evaluation was performed in a laboratory at room temperature (25° C.).

One of the ink sets 1 to 9 was charged in the ink jet printer PX-G930 and was ejected on a recording medium. Printing conditions include three printer heater settings of "default (the printing surface temperature of room temperature (25° C.))", "the printing surface temperature of 40° C.", and "the printing surface temperature of 80° C.". A print pattern was a fill pattern at a resolution of 360 dpi×360 dpi.

Immediately after printing, printed matter was dried at a temperature of 25° C., 40° C., 60° C., or 80° C. without wind or with a breeze or strong wind for one minute. The term "breeze", as used herein, refers to an air velocity on a recording medium surface approximately in the range of 2 to 5 m/s. The term "strong wind", as used herein, refers to an air velocity on a recording medium surface approximately in the range of 6 to 10 m/s. The printed matter was left stand in a laboratory at room temperature (25° C.) for five hours. The printed matter was then rubbed 20 times with a cotton cloth using an AB-301 Color Fastness Rubbing Tester (trade name, manufactured by Tester Sangyo Co., Ltd.) at a load of 500 g. Abrasion of a printed surface and staining of the cotton cloth were examined to evaluate abrasion resistance. Evaluation criteria of abrasion resistance are as follows:

A: Neither abrasion of ink nor staining of a cotton cloth was observed after rubbing 20 times.

B: Slight abrasion of ink or slight staining of a cotton cloth was observed after rubbing 20 times.

C: Abrasion of ink or staining of a cotton cloth was observed after rubbing 20 times.

D: Abrasion of ink or staining of a cotton cloth was observed before rubbing 20 times.

The evaluation criteria A and B are determined to be "pass", and the evaluation criteria C and D are determined to be "fail".

Table 2 shows the results obtained at a printer heater setting of "default (the printing surface temperature of room temperature (25° C.))". Table 3 shows the results obtained at a printer heater setting of "the printing surface temperature of 40° C.". Table 4 shows the results obtained at a printer heater setting of "the printing surface temperature of 80° C.".

TABLE 2

Printer heater setting in printing: "default (printing surface temperature of room temperature (25° C.))"

Evaluation conditions

| Environmental temperature after printing | Air | Ink set composition | | | | | | | | |
|---|---|---|---|---|---|---|---|---|---|---|
| | | 1 | 2 | 3 | 4 | 5 | 6 | 7 | 8 | 9 |
| 25° C. | None | D | D | C | C | C | C | D | C | D |
| | Weak | C | D | C | C | C | C | D | C | D |
| | Strong | C | C | B | C | C | B | C | C | C |
| 40° C. | None | B | B | A | B | C | A | D | C | D |
| | Weak | A | B | A | B | B | A | C | C | C |
| | Strong | A | A | A | A | B | A | C | C | C |
| 60° C. | None | A | B | A | A | B | A | C | C | C |
| | Weak | A | A | A | A | A | A | C | C | C |
| | Strong | A | A | A | A | A | A | C | B | C |
| 80° C. | None | A | A | A | A | B | A | C | C | C |
| | Weak | A | A | A | A | A | A | C | B | C |
| | Strong | A | A | A | A | A | A | C | B | B |

TABLE 3

Printer heater setting in printing: "printing surface temperature of 40° C."

Evaluation conditions

| Environmental temperature after printing | Air | Ink set composition | | | | | | | | |
|---|---|---|---|---|---|---|---|---|---|---|
| | | 1 | 2 | 3 | 4 | 5 | 6 | 7 | 8 | 9 |
| 25° C. | None | C | C | C | C | C | C | D | C | D |
| | Weak | C | C | B | B | C | C | C | C | C |
| | Strong | B | B | B | B | B | B | C | C | C |
| 40° C. | None | B | B | A | B | B | A | D | C | D |
| | Weak | A | B | A | A | B | A | C | C | C |
| | Strong | A | A | A | A | A | A | C | C | C |
| 60° C. | None | A | B | A | A | B | A | C | C | C |
| | Weak | A | A | A | A | A | A | C | C | C |
| | Strong | A | A | A | A | A | A | C | B | C |
| 80° C. | None | A | A | A | A | B | A | C | C | C |
| | Weak | A | A | A | A | A | A | C | B | C |
| | Strong | A | A | A | A | A | A | C | B | B |

TABLE 4

Printer heater setting in printing: "printing surface temperature of 80° C."

Evaluation conditions

| Environmental temperature after printing | Air | Ink set composition | | | | | | | | |
|---|---|---|---|---|---|---|---|---|---|---|
| | | 1 | 2 | 3 | 4 | 5 | 6 | 7 | 8 | 9 |
| 25° C. | None | C | C | B | C | C | C | D | C | D |
| | Weak | B | B | B | B | B | B | C | C | C |
| | Strong | A | B | B | B | B | B | C | C | C |
| 40° C. | None | A | B | A | B | B | A | C | C | D |
| | Weak | A | A | A | A | A | A | C | C | C |
| | Strong | A | A | A | A | A | A | C | C | C |
| 60° C. | None | A | A | A | A | B | A | C | C | C |
| | Weak | A | A | A | A | A | A | C | B | C |
| | Strong | A | A | A | A | A | A | C | B | B |
| 80° C. | None | A | A | A | A | A | A | C | C | C |
| | Weak | A | A | A | A | A | A | C | B | B |
| | Strong | A | A | A | A | A | A | C | B | B |

Tables 2 to 4 show that the ink sets 1 to 6, which had a composition suitable for a printing method according to the invention, had high abrasion resistance after an appropriate drying process. However, the ink sets 1 to 6 after an inappropriate drying process had low abrasion resistance. The ink sets 7 to 9, which had an inappropriate composition for a printing method according to the invention, had low abrasion resistance even after an appropriate drying process.

The evaluation of abrasion resistance shown in Tables 2 to 4 was obtained for printed matter on both the non-ink-absorbing poly(ethylene terephthalate) film, a cold laminate film PG-50L (trade name, manufactured by Lami Co.), and the low ink-absorbing gloss ultra lightweight coated paper, OK Top Coat+ (trade name, manufactured by Oji Paper Co., Ltd.).

2.2.2 Evaluation of Drying Characteristics

Recording media used were a non-ink-absorbing poly(ethylene terephthalate) film, a cold laminate film PG-50L (trade name, manufactured by Lami Co.), and low ink-absorbing gloss ultra lightweight coated paper, OK Top Coat+ (trade name, manufactured by Oji Paper Co., Ltd.).

An ink jet printer used was an ink jet printer PX-G930 (trade name, manufactured by Seiko Epson Co., nozzle resolution: 180 dpi), which has a temperature-variable heater in a paper guide. The evaluation was performed in a laboratory at room temperature (25° C.).

One of the ink sets 1 to 9 was charged in the ink jet printer PX-G930 and was ejected on a recording medium. Printing conditions include three printer heater settings of "default (the printing surface temperature of room temperature (25° C.))", "the printing surface temperature of 40° C.", and "the printing surface temperature of 80° C.". A print pattern was a fill pattern that could be printed at a resolution of 360 dpi×360 dpi and a duty in the range of 50% to 100% in increments of 10%.

Immediately after printing, printed matter was dried at a temperature of 25° C., 40° C., 60° C., or 80° C. without wind or with a breeze or strong wind for one minute. The term "breeze", as used herein, refers to an air velocity on a recording medium surface approximately in the range of 2 to 5 m/s. The term "strong wind", as used herein, refers to an air velocity on a recording medium surface approximately in the range of 6 to 10 m/s. The drying characteristics were evaluated by determining a duty at which a displacement or abrasion of ink was not observed in the fill pattern when the printed surface of printed matter after drying was rubbed with a finger. The term "duty", as used herein, refers to the percentage (%) of ink-dotted partitions. In the case of 360 dpi×360 dpi, an area of one square inch is divided into 360×360=129,600 partitions. For example, 50% duty indicates that 64,800 partitions (=129,600 partitions×50%) are ink-dotted. Evaluation criteria of drying characteristics are as follows:

A: Neither displacement nor abrasion of ink was observed at a duty of 80% or more.

B: Neither displacement nor abrasion of ink was observed at a duty of 70% or less.

C: Neither displacement nor abrasion of ink was observed at a duty of 60% or less.

D: A displacement or abrasion of ink was observed even at a duty of 60% or less.

Table 5 shows the results obtained at a printer heater setting of "default (the printing surface temperature of room temperature (25° C.))". Table 6 shows the results obtained at a printer heater setting of "the printing surface temperature of 40° C.". Table 7 shows the results obtained at a printer heater setting of "the printing surface temperature of 80° C.".

TABLE 5

Printer heater setting in printing: "default (printing surface temperature of room temperature (25° C.))"

| Evaluation conditions | | | Ink set composition | | | | | | | | |
|---|---|---|---|---|---|---|---|---|---|---|---|
| Environmental temperature after printing | Air | 1 | 2 | 3 | 4 | 5 | 6 | 7 | 8 | 9 |
| 25° C. | None | D | C | C | D | D | D | D | D | D |
|  | Weak | C | C | C | C | C | D | D | D | D |
|  | Strong | C | B | C | C | C | C | D | D | D |
| 40° C. | None | B | A | B | B | B | B | D | C | C |
|  | Weak | A | A | B | B | B | B | D | C | C |
|  | Strong | A | A | A | A | B | B | B | B | B |
| 60° C. | None | A | A | B | B | B | B | D | C | C |
|  | Weak | A | A | A | B | B | B | C | B | B |
|  | Strong | A | A | A | A | A | A | B | A | A |
| 80° C. | None | A | A | A | A | A | B | C | B | B |
|  | Weak | A | A | A | A | A | B | A | A | B |
|  | Strong | A | A | A | A | A | A | A | A | A |

TABLE 6

Printer heater setting in printing: "printing surface temperature of 40° C."

| Evaluation conditions | | | Ink set composition | | | | | | | | |
|---|---|---|---|---|---|---|---|---|---|---|---|
| Environmental temperature after printing | Air | 1 | 2 | 3 | 4 | 5 | 6 | 7 | 8 | 9 |
| 25° C. | None | C | C | C | C | C | C | D | D | D |
|  | Weak | B | B | C | C | C | C | D | D | D |
|  | Strong | B | A | B | B | B | C | C | C | C |
| 40° C. | None | B | A | B | B | B | B | D | C | C |
|  | Weak | A | A | B | B | B | B | D | C | C |
|  | Strong | A | A | A | A | A | B | B | B | B |
| 60° C. | None | A | A | B | B | B | B | D | C | C |
|  | Weak | A | A | A | B | B | B | C | B | B |
|  | Strong | A | A | A | A | A | A | B | A | A |
| 80° C. | None | A | A | A | A | A | B | C | B | B |
|  | Weak | A | A | A | A | A | B | A | B |  |
|  | Strong | A | A | A | A | A | A | A | A | A |

TABLE 7

Printer heater setting in printing: "printing surface temperature of 80° C."

| Evaluation conditions | | | Ink set composition | | | | | | | | |
|---|---|---|---|---|---|---|---|---|---|---|---|
| Environmental temperature after printing | Air | 1 | 2 | 3 | 4 | 5 | 6 | 7 | 8 | 9 |
| 25° C. | None | B | B | C | C | C | C | D | D | D |
|  | Weak | B | B | B | B | B | C | C | D | D |
|  | Strong | B | A | B | B | B | B | C | C | C |
| 40° C. | None | A | A | B | B | B | B | D | C | C |
|  | Weak | A | A | A | B | A | B | C | B | C |
|  | Strong | A | A | A | A | A | A | B | B | B |
| 60° C. | None | A | A | A | B | B | B | C | B | B |
|  | Weak | A | A | A | A | A | C | B | B | B |
|  | Strong | A | A | A | A | A | A | B | A | A |
| 80° C. | None | A | A | A | A | A | A | B | B | B |
|  | Weak | A | A | A | A | A | B | A | A |  |
|  | Strong | A | A | A | A | A | A | A | A | A |

Tables 5 to 7 show that the ink sets 1 to 6, which had a composition suitable for a printing method according to the invention, had excellent drying characteristics after an appropriate drying process. However, the ink sets 1 to 6 after an inappropriate drying process had poor drying characteristics. The ink sets 7 to 9, which had an inappropriate composition as an aqueous ink composition for a printing method according to the invention, had poor drying characteristics even after an appropriate drying process.

The evaluation of drying characteristics shown in Tables 5 to 7 were obtained for printed matter on both the non-ink-absorbing poly(ethylene terephthalate) film, a cold laminate film PG-50L (trade name, manufactured by Lami Co.), and the low ink-absorbing gloss ultra lightweight coated paper, OK Top Coat+ (trade name, manufactured by Oji Paper Co., Ltd.).

2.2.3 Evaluation of Malodor in Printing

A recording medium used was a non-ink-absorbing poly (ethylene terephthalate) film, a cold laminate film PG-50L (trade name, manufactured by Lami Co.).

An ink jet printer used was an ink jet printer PX-G930 (trade name, Seiko Epson Co., nozzle resolution: 180 dpi) used in "2.2.2 Evaluation of Drying Characteristics". A print pattern used was the print pattern also used in "2.2.2 Evaluation of Drying Characteristics". The evaluation was performed in a laboratory at room temperature (25° C.).

One of the ink sets 1 to 9 was charged in the ink jet printer PX-G930 and was ejected on the recording medium at a printer heater setting of "the printing surface temperature of 40° C.". Under such conditions, the odor intensity in continuous printing was examined to evaluate malodor. Evaluation criteria of malodor are as follows:

A: Almost no malodor.

B: Slight malodor without problems.

C: Malodor.

D: Intolerable strong malodor.

TABLE 8

| Heater setting | Ink set composition | | | | | | | | |
|---|---|---|---|---|---|---|---|---|---|
| | 1 | 2 | 3 | 4 | 5 | 6 | 7 | 8 | 9 |
| Printing surface temperature of 40° C. | A | A | B | B | B | B | C | D | C |

Table 8 shows that the ink sets 1 to 6, which had a composition suitable for a printing method according to the invention, had little or slight malodor without problems in the continuous printing. The ink sets 7 to 9, which had an inappropriate composition as an aqueous ink composition for a printing method according to the invention, had malodor or intolerable strong malodor.

2.2.4 Evaluation of Bleeding of Printed Matter

Recording media used were a non-ink-absorbing poly (ethylene terephthalate) film, a cold laminate film PG-50L (trade name, manufactured by Lami Co.), and low ink-absorbing gloss ultra lightweight coated paper, OK Top Coat+ (trade name, manufactured by Oji Paper Co., Ltd.).

An ink jet printer used was an ink jet printer PX-G930 (trade name, manufactured by Seiko Epson Co., nozzle resolution: 180 dpi), which has a temperature-variable heater in a paper guide. The evaluation was performed in a laboratory at room temperature (25° C.).

One of the ink sets 1 to 9 was charged in the ink jet printer PX-G930 and was ejected on a recording medium. Printing conditions include six printer heater settings of "default (the printing surface temperature of room temperature (25° C.))", "the printing surface temperature of 35° C.", "the printing surface temperature of 40° C.", "the printing surface temperature of 60° C.", "the printing surface temperature of 80° C.", and "the printing surface temperature of 100° C.". A print pattern was a pattern in which different color inks were in contact with or overlapped one another at a resolution of 360 dpi×360 dpi and that could be printed at a duty in the range of 50% to 100% in increments of 10%. Bleeding in monochrome and polychrome printed matter printed under such conditions was visually inspected. Evaluation criteria of bleeding in printed matter are as follows:

A: No bleeding was observed at a duty of 80% or more.

B: No bleeding was observed at a duty of up to 70%.

C: No bleeding was observed at a duty of up to 60%.

D: Bleeding was observed even at a duty of 60% or less.

TABLE 9

| Heater setting | Ink set composition | | | | | | | | |
|---|---|---|---|---|---|---|---|---|---|
| | 1 | 2 | 3 | 4 | 5 | 6 | 7 | 8 | 9 |
| Printing surface temperature of | | | | | | | | | |
| 25° C. | C | C | B | C | C | C | D | D | D |
| 35° C. | B | C | B | C | B | C | D | D | D |
| 40° C. | A | B | A | B | B | B | D | C | C |
| 60° C. | A | A | A | A | A | A | C | C | C |
| 80° C. | A | A | A | A | A | A | C | B | B |
| 100° C. | A | A | A | A | A | A | B | B | B |

Table 9 shows that the ink sets 1 to 6, which had a composition suitable for a printing method according to the invention, provided printed matter without significant bleeding after an appropriate drying process. However, some of the ink sets 1 to 6 had an evaluation criterion C at a heater setting temperature of 35° C. or less. Although the ink sets 1 to 6 had an evaluation criterion of A at a heater setting temperature of 100° C., a recording medium often deformed because of the high temperature and could not be transported and printed. Even when a recording medium could be printed, the recording medium often deformed during cooling to room temperature, thus yielding unsuccessful printed matter. With the ink sets 7 to 9, which had an inappropriate composition as an aqueous ink composition for a printing method according to the invention, printed matter had much bleeding.

The evaluation of bleeding in printed matter shown in Table 9 was obtained for printed matter on both the non-ink-absorbing poly(ethylene terephthalate) film, a cold laminate film PG-50L (trade name, manufactured by Lami Co.), and the low ink-absorbing gloss ultra lightweight coated paper, OK Top Coat+ (trade name, manufactured by Oji Paper Co., Ltd.).

2.2.5 Evaluation of Inconsistencies in Density of Printed Matter

Recording media used were a non-ink-absorbing poly (ethylene terephthalate) film, a cold laminate film PG-50L (trade name, manufactured by Lami Co.), and low ink-absorbing gloss ultra lightweight coated paper, OK Top Coat+ (trade name, manufactured by Oji Paper Co., Ltd.).

An ink jet printer used was an ink jet printer PX-G930 (trade name, manufactured by Seiko Epson Co., nozzle resolution: 180 dpi), which has a temperature-variable heater in a paper guide.

One of the ink sets 1 to 9 was charged in the ink jet printer PX-G930 and was ejected on a recording medium. Printing conditions include six printer heater settings of "default (the printing surface temperature of room temperature (25° C.))", "the printing surface temperature of 35° C.", "the printing surface temperature of 40° C.", "the printing surface temperature of 60° C.", "the printing surface temperature of 80° C.", and "the printing surface temperature of 100° C.". A print pattern was a fill pattern that could be printed at a resolution of 360 dpi×360 dpi and a duty in the range of 50% to 100% in increments of 10%. Inconsistencies in density of printed matter printed under such conditions were visually inspected. Evaluation criteria of inconsistencies in density of printed matter are as follows:

A: No inconsistency in density was observed at a duty of 80% or more.

B: No inconsistency in density was observed at a duty of up to 70%.

C: No inconsistency in density was observed at a duty of up to 60%.

D: Inconsistencies in density were observed even at a duty of 60% or less.

TABLE 10

| Heater setting | Ink set composition | | | | | | | | |
|---|---|---|---|---|---|---|---|---|---|
| | 1 | 2 | 3 | 4 | 5 | 6 | 7 | 8 | 9 |
| Printing surface temperature of 25° C. | C | C | B | C | C | C | D | D | D |
| 35° C. | B | B | B | B | B | B | D | D | D |
| 40° C. | A | B | A | A | A | B | C | C | C |
| 60° C. | A | A | A | A | A | A | C | C | C |
| 80° C. | A | A | A | A | A | A | C | B | B |
| 100° C. | A | A | A | A | A | A | B | B | B |

Table 10 shows that the ink sets 1 to 6, which had a composition suitable for a printing method according to the invention, provided printed matter without significant inconsistencies in density after an appropriate drying process. However, most of the ink sets 1 to 6 had an evaluation criterion C at a heater setting temperature of room temperature (25° C.). Although the ink sets 1 to 6 had an evaluation criterion of A at a heater setting temperature of 100° C., a recording medium often deformed because of the high temperature and could not be transported and printed. Even when a recording medium could be printed, the recording medium often deformed during cooling to room temperature, thus yielding unsuccessful printed matter. With the ink sets 7 to 9, which had an inappropriate composition as an aqueous ink composition for a printing method according to the invention, printed matter had many inconsistencies in density.

The evaluation of inconsistencies in density shown in Table 10 was obtained for printed matter on both the non-ink-absorbing poly(ethylene terephthalate) film, a cold laminate film PG-50L (trade name, manufactured by Lami Co.), and the low ink-absorbing gloss ultra lightweight coated paper, OK Top Coat+ (trade name, manufactured by Oji Paper Co., Ltd.).

The invention is not limited to the embodiments described above, and various modifications may be made therein. For example, the invention includes substantially the same constitutions as those described in the embodiments (for example, constitutions having the same functions, methods, and results, and constitutions having the same objects and advantages). The invention also includes constitutions in which unessential portions of the constitutions described in the embodiments are substituted. The invention also includes constitutions that have the same operation and effect of the constitutions described in the embodiments and constitutions with which the same objects can be achieved. The invention also includes constitutions in which the constitutions described in the embodiments are combined with known techniques.

What is claimed is:

1. An ink jet printing method, comprising:
    forming an image by discharging droplets of an aqueous ink composition onto a non-ink-absorbing or low ink-absorbing recording medium by ink jet printing; and
    drying the aqueous ink composition on the recording medium during and/or after forming the image,
    wherein the aqueous ink composition contains a pigment, resin particles, a silicone surfactant, an acetylene glycol surfactant, a 1,2-alkyldiol comprising an alkyl group having 4 to 8 carbon atoms, a polyhydric alcohol, and water, and
    the resin particles contain resin fixative particles and wax particles, wherein the resin fixative particles comprise at least one component having a glass transition temperature (Tg) of 30° C. or more, and wherein the recording medium has a surface that is a plastic film.

2. The ink jet printing method according to claim 1, wherein the wax particles are polyolefin wax particles.

3. The ink jet printing method according to claim 1, wherein the drying the aqueous ink composition comprises heating the recording medium to a temperature in the range of 40° C. to 80° C. and/or blowing air at a temperature in the range of 40° C. to 80° C. toward the aqueous ink composition deposited on the recording medium.

4. The ink jet printing method according to claim 1, wherein the aqueous ink composition has a printing resolution of 360 dots per inch (dpi) or more, and the ratio of ink jet nozzle resolution to printing resolution ranges from one to two.

5. The ink jet printing method according to claim 1, wherein the aqueous ink composition has a viscosity in the range of 1.5 to 15 mPa·s at 20° C.

6. The ink jet printing method according to claim 1, wherein the aqueous ink composition contains 0.1% to 1.5% by mass of a silicone surfactant.

7. The ink jet printing method according to claim 1, wherein the aqueous ink composition contains 0.1% to 1.0% by mass of an acetylene glycol surfactant.

8. The ink jet printing method according to claim 1, wherein the aqueous ink composition contains a pyrrolidone derivative in an amount of 1.0% to 8.0% by mass and the total amount of pyrrolidone derivative and 1,2-alkyldiol is 10.0% by mass or less.

9. The ink jet printing method according to claim 1, wherein the aqueous ink composition contains a pyrrolidone derivative which is 2-pyrrolidone.

10. The ink jet printing method according to claim 1, wherein the polyhydric alcohol is at least one selected from the group consisting of ethylene glycol, diethylene glycol, triethylene glycol, propylene glycol, and dipropylene glycol.

11. An ink jet printing method, comprising the steps of:
    (a) providing an aqueous ink composition comprising pigment in an amount of 0.5% to 20% by mass; resin particles in an amount of 0.1% to 15% by mass based on solid content of the ink composition; a silicone surfactant in an amount of 0.1% to 1.5% by mass; an acetylene glycol surfactant in an amount of 0.1% to 1.0% by mass; a 1,2-alkyldiol comprising an alkyl group having 4 to 8 carbon atoms in an amount of 1% to 8% by mass; a polyhydric alcohol in an amount of 2% to 20% by mass; and water; wherein the resin particles contain resin fixative particles and wax particles;
    (b) forming an image by discharging droplets of the aqueous ink composition onto a non-ink-absorbing or low ink-absorbing recording medium by ink jet printing; and
    (c) drying the aqueous ink composition on the recording medium during forming of the image, after forming of the image or both under drying conditions effective for improving the abrasion resistance of the formed image as compared with the abrasion resistance of the image if formed with the aqueous ink composition without the wax particles.

12. The ink jet printing method according to claim 11 wherein the wax particles are polyolefin wax particles.

13. The ink jet printing method according to claim 11, wherein the drying in step (b) comprising heating the recording medium to a temperature in the range of 40° C. to 80° C. and/or blowing air at a temperature in the range of 40° C. to 80° C. toward the aqueous ink composition discharged on the recording medium.

14. The ink jet printing method according to claim 11, wherein the aqueous ink composition has a printing resolution of 360 dots per inch (dpi) or more, and the ratio of ink jet nozzle resolution to printing resolution ranges from one to two.

15. The ink jet printing method according to claim 11, wherein the aqueous ink composition has a viscosity in the range of 1.5 to 15 mPa-s at 20° C.

16. The ink jet printing method according to claim 11, wherein the aqueous ink composition comprises a pyrrolidone derivative which is 2-pyrrolidone.

17. The ink jet printing method according to claim 11, wherein the polyhydric alcohol is at least one selected from the group consisting of ethylene glycol, diethylene glycol, triethylene glycol, propylene glycol and dipropylene glycol.

18. The ink jet printing method according to claim 11, wherein the aqueous ink composition comprises a pyrrolidone derivative, and wherein the total amount of pyrrolidone derivative and 1,2-alkyldiol is 10.0% by mass or less.

19. The ink jet printing method according to claim 11, wherein a ratio of the resin fixative particles to wax particles in the resin particles is from 1:1 to 5:1 based on solid content.

* * * * *